(12) United States Patent
Huart et al.

(10) Patent No.: US 9,802,709 B2
(45) Date of Patent: Oct. 31, 2017

(54) METHOD AND SYSTEM FOR EMERGENCY VENTILATING AND PRESSURIZING AN AIRCRAFT CABIN

(71) Applicant: Airbus Operations GmbH, Hamburg (DE)

(72) Inventors: David Huart, Hamburg (DE); Hanjo Hadewig, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 478 days.

(21) Appl. No.: 14/100,158

(22) Filed: Dec. 9, 2013

(65) Prior Publication Data

US 2014/0162542 A1 Jun. 12, 2014

Related U.S. Application Data

(60) Provisional application No. 61/735,071, filed on Dec. 10, 2012.

(30) Foreign Application Priority Data

Dec. 10, 2012 (EP) .................................... 12196224

(51) Int. Cl.
*B64D 13/04* (2006.01)
*B64D 13/02* (2006.01)
*B64D 13/06* (2006.01)

(52) U.S. Cl.
CPC ............ *B64D 13/04* (2013.01); *B64D 13/02* (2013.01); *B64D 2013/064* (2013.01); *B64D 2013/0618* (2013.01); *Y02T 50/56* (2013.01)

(58) Field of Classification Search
CPC ........ B64D 13/02; B64D 13/04; B64D 13/00; B64D 2013/0618; B64D 2013/064; B64D 11/00; Y02T 50/56

(Continued)

(56) References Cited

U.S. PATENT DOCUMENTS 3,101,918 A 8/1963 Evelyn et al.
4,553,474 A * 11/1985 Wong ..................... B64D 13/04
454/71

(Continued)

FOREIGN PATENT DOCUMENTS

CN 1894130 1/2007
CN 101107166 1/2008

(Continued)

OTHER PUBLICATIONS

Chinese Office Action, Jul. 1, 2015.
European Search Report, May 6, 2013.

*Primary Examiner* — Steven B McAllister
*Assistant Examiner* — Ko-Wei Lin
(74) *Attorney, Agent, or Firm* — Greer, Burns & Crain Ltd.

(57) ABSTRACT

A method for emergency ventilating and pressurizing an aircraft cabin comprises determining a cabin pressure within the aircraft cabin and determining an ambient pressure in an aircraft environment. Descent of the aircraft is initiated when the cabin pressure falls below a predetermined threshold value. A supply of ambient air from the aircraft environment into the aircraft cabin is initiated, when, during descent of the aircraft, a differential pressure between the cabin pressure and the ambient pressure falls below a first calculated threshold value. The supply of ambient air into the aircraft cabin and an operation of an air outflow valve of a cabin pressurization system of the aircraft are controlled such that a flow of ambient air into the aircraft cabin corresponds to at least a predetermined minimum value and the differential pressure between the cabin pressure and the ambient pressure does not fall below a second calculated threshold value.

15 Claims, 4 Drawing Sheets

(58) Field of Classification Search
USPC .................................. 244/118.5; 454/74–76
See application file for complete search history.

(56) References Cited

U.S. PATENT DOCUMENTS

| | | | | |
|---|---|---|---|---|
| 5,186,681 | A | * | 2/1993 | Emmons ................ B64D 13/04 454/74 |
| 6,019,677 | A | * | 2/2000 | Demster .................. F24F 7/10 454/289 |
| 2003/0132344 | A1 | | 7/2003 | Johnson et al. |
| 2007/0117501 | A1 | | 5/2007 | Solntsev et al. |
| 2009/0291625 | A1 | | 11/2009 | Klimpel et al. |
| 2011/0046822 | A1 | * | 2/2011 | Gray ..................... B64D 13/04 701/3 |
| 2011/0306285 | A1 | | 12/2011 | Heuer |

FOREIGN PATENT DOCUMENTS

| | | | | |
|---|---|---|---|---|
| CN | 102209664 | | 10/2011 | |
| DE | 10145687 | | 4/2003 | |
| DE | 10145687 A1 | * | 4/2003 | ............ B64D 13/02 |
| DE | WO 2007054206 A1 | * | 5/2007 | ............ B64D 13/02 |
| DE | 102006016541 | | 10/2007 | |
| DE | 102008056417 | | 5/2010 | |
| DE | 102008058451 | | 5/2010 | |
| EP | 1327581 | | 7/2003 | |
| WO | 2007115811 | | 10/2007 | |
| WO | 2010051920 | | 5/2010 | |
| WO | 2010057548 | | 5/2010 | |

\* cited by examiner

METHOD AND SYSTEM FOR EMERGENCY VENTILATING AND PRESSURIZING AN AIRCRAFT CABIN

CROSS-REFERENCES TO RELATED APPLICATIONS

This application claims the benefit of the U.S. Provisional Application No. 61/735,071, filed on Dec. 10, 2012, and of the European patent application No. 12 196 224.5 filed on Dec. 10, 2012, the entire disclosures of which are incorporated herein by way of reference.

BACKGROUND OF THE INVENTION

The invention relates to an improved method for emergency ventilating and pressurizing an aircraft cabin in case of a depressurization of the aircraft cabin, for example due to failure of an aircraft air conditioning system and the presence of a leakage or hole in a fuselage of the aircraft. The invention further relates to an improved system for emergency ventilating and pressurizing an aircraft cabin.

In an aircraft cabin, an aircraft air conditioning system known, for example, from DE 10 2006 016 541 A1 or WO 2007/115811 A1, usually ensures a necessary air exchange and controls the cabin pressure and cabin temperature. The term aircraft cabin is to be understood here as all areas of the aircraft which are to be ventilated and pressurized during normal operation of an aircraft, such as, for example, a cockpit, a passenger cabin, crew areas, and at least selected cargo compartments. The cabin internal pressure is controlled by means of a cabin pressure control system which comprises controllable air outlet valves arranged in the area of a skin of the aircraft fuselage.

If during the flight, for example due to failure of the aircraft air conditioning system and the presence of a leakage or hole in the fuselage of the aircraft, a depressurization of the aircraft cabin occurs, the aircraft descends to a safe altitude of approximately 10,000 feet (3048 meters) and flies to the destination airport or to an airfield situated nearer. In order to supply the necessary breathable air for the passengers during this period, it is known to provide aircraft with one or more so-called emergency ram air inlets which allow ram air to be fed from the aircraft environment directly into an air distribution system of the aircraft. The air distribution within the aircraft cabin is supported by controlling the air outlet valves of the cabin pressure control system into an open position.

DE 10 2008 058 451 A1 or WO 2010/057548 A1 describes a system and a method for emergency ventilation of an aircraft cabin in the specific event of a leakage occurring in the region of an air mixer of the aircraft air conditioning system. Further, DE 10 2008 056 417 A1 or WO 2010/051920 A2 discloses a system and a method for emergency ventilation of an aircraft cabin, wherein a first and a second valve, which during normal operation of the aircraft serve as air outlet valves of the cabin pressure control system, in the event of a failure of the aircraft air conditioning system, are controlled such that air is supplied from the aircraft environment into the aircraft cabin via the first valve and discharged back into the aircraft environment via the second valve.

During descent of the aircraft to the safe altitude of approximately 10,000 feet (3048 meters), the decreasing pressure within the aircraft cabin converges to the increasing ambient pressure and, in dependence on the descent rate of the aircraft and the depressurization rate within the aircraft cabin, might become lower than the ambient pressure resulting in the build-up of a so-called negative differential pressure between the aircraft cabin pressure and the ambient pressure. To ensure the integrity of the aircraft structure, the negative differential pressure should not exceed a critical value. Therefore, a negative relief valve might be provided, which opens upon occurrence of a small negative differential pressure and hence allows air from the aircraft environment to enter the aircraft cabin providing for a pressure equalization between the aircraft environment and the aircraft cabin.

As an alternative, it is known from DE 101 45 687 A1 to open the emergency ram air inlets prior to the occurrence of a negative differential pressure and to supply ram air from the aircraft environment to the aircraft cabin. The ram air supplied to the aircraft cabin provides for a partial re-pressurization of the aircraft cabin and prevents the build-up of a negative differential pressure until finally a pressure equalization between the aircraft environment and the aircraft cabin occurs.

However, independent of whether a negative relief valve or the emergency ram air inlets are used to supply ambient air from the aircraft environment to the aircraft cabin and to thus prevent a negative differential pressure to occur or at least from exceeding a critical value, a pressure equalization between the aircraft environment and the aircraft cabin might take place before the aircraft has reached the safe altitude of approximately 10,000 feet (3048 meters). In this case, the descent rate of the aircraft to the safe altitude has to be suitably controlled such that the build-up of a negative differential pressure is prevented, usually increasing the descent time of the aircraft to the safe altitude. When the aircraft has reached the safe altitude, air is supplied to the aircraft cabin via the emergency ram air inlets with the outflow valves of the cabin pressurization system being in an open position so as to support the air distribution within the aircraft cabin. As a result, during cruising at the safe altitude, the aircraft cabin remains unpressurised.

SUMMARY OF THE INVENTION

The invention is directed at the object of providing a reliable method and system for emergency ventilating and pressurizing an aircraft cabin, which enhance the comfort of the passengers and the crew members on board the aircraft during emergency ventilation operation of the aircraft.

In a method for emergency ventilating and pressurizing an aircraft cabin, a cabin pressure prevailing within the aircraft cabin is determined. For example, the cabin pressure may be determined by means of suitable pressure sensors distributed within the aircraft cabin. Further, an ambient pressure prevailing in an aircraft environment may be determined. The ambient pressure may be determined by means of a suitable pressure sensor disposed, for example, within a non-pressurized region of the aircraft.

When the cabin pressure, for example due to failure of an aircraft air conditioning system and the presence of a leakage or hole in a fuselage of the aircraft, falls below a predetermined threshold value, descent of the aircraft is initiated. The descent of the aircraft may be initiated either automatically or manually by the pilot. During descent of the aircraft, the cabin pressure continues to fall. Simultaneously, the ambient pressure rises due to the aircraft reaching a lower altitude.

When, during descent of the aircraft, a differential pressure between the cabin pressure and the ambient pressure falls below a first calculated threshold value, a supply of ambient air from the aircraft environment into the aircraft cabin is initiated. For example, the supply of ambient air from the aircraft environment into the aircraft cabin may be achieved by opening an emergency ram air channel. Alternatively, it is, however, also conceivable to supply ambient air from the aircraft environment into the aircraft cabin through a suitable valve, such as, for example, an outflow valve of a cabin pressurization system of the aircraft, as described in DE 10 2008 056 417 A1 or WO 2010/051920 A2. The supply of ambient air from the aircraft environment into the aircraft cabin may be initiated either automatically or manually by the pilot.

The method for emergency ventilating and pressurizing the aircraft cabin further involves a control of the supply of ambient air from the aircraft environment into the aircraft cabin and the control of an operation of an air outflow valve of a cabin pressurization system of the aircraft. In particular, the supply of ambient air from the aircraft environment into the aircraft cabin and the operation of the air outflow valve of the cabin pressurization system of the aircraft are controlled such that a flow of ambient air from the aircraft environment into the aircraft cabin corresponds to at least a predetermined minimum value. The supply of ambient air from the aircraft environment into the aircraft cabin may be controlled by suitably controlling a flow cross-section of an emergency ram air channel inlet or by suitably controlling a flow cross-section of a valve allowing the supply of ambient air from the aircraft environment into the aircraft cabin.

The flow of ambient air from the aircraft environment into the aircraft cabin may be measured, for example by means of a flow sensor disposed in an emergency ram air channel or downstream of a valve allowing the supply of ambient air from the aircraft environment into the aircraft cabin. Alternatively, the air flow may be calculated. As a result, the supply of ambient air from the aircraft environment into the aircraft cabin may be controlled based on a feedback signal indicative of the flow of ambient air from the aircraft environment into the aircraft cabin such that the flow of ambient air from the aircraft environment into the aircraft cabin does not fall below the predetermined minimum value. Preferably, the predetermined minimum value of the flow of ambient air from the aircraft environment into the aircraft cabin is selected so as to ensure that the passengers and the crew members on board the aircraft are provided with a sufficient amount of oxygen which guarantees a desired comfort level for the passengers and the crew members on board the aircraft.

Further, the supply of ambient air from the aircraft environment into the aircraft cabin and the operation of the air outflow valve of the cabin pressurization system of the aircraft are controlled such that the differential pressure between the cabin pressure and the ambient pressure does not fall below a second calculated threshold value. The second calculated threshold value of the differential pressure between the cabin pressure and the ambient pressure might be lower than the first calculated threshold value, but still is a positive value, i.e., ensures that the cabin pressure is maintained above the ambient pressure.

The method for emergency ventilating and pressurizing an aircraft cabin allows reliably preventing a build-up of a negative differential pressure between the aircraft cabin pressure and the ambient pressure thus ensuring the integrity of the aircraft structure during descent of the aircraft. Further, due to the involvement of the cabin pressurization system in the control of the cabin pressure, the cabin pressure is maintained above the ambient pressure, i.e., an equalization between the cabin pressure and the ambient pressure is avoided. As a result, the descent rate of the aircraft no longer has to be controlled in a manner so as to avoid a build-up of a negative differential pressure between the cabin pressure and the ambient pressure. Further, during control of the descent rate of the aircraft, it is no longer necessary to adjust the descent rate so as to ensure the comfort of the passengers and the crew members within the unpressurized aircraft cabin. As a result, descent time can be minimized while still ensuring a high level of comfort for the passengers and the crew members within the aircraft cabin.

Preferably, the supply of ambient air from the aircraft environment into the aircraft cabin and the operation of the air outflow valve of the cabin pressurization system of the aircraft are controlled such that a re-pressurization rate within the aircraft cabin is lower than an ambient pressure increase rate during descent of the aircraft. In other words, preferably, the supply of ambient air from the aircraft environment into the aircraft cabin and the operation of the air outflow valve of the cabin pressurization system of the aircraft are controlled such that a smooth re-pressurization of the aircraft cabin is achieved independent of the development of the ambient pressure during descent of the aircraft, further enhancing the comfort level for the passengers and the crew members on board the aircraft.

During descent of the aircraft, the differential pressure between the cabin pressure and the ambient pressure, which at the beginning of the descent corresponds to the first calculated threshold value, may converge to the second calculated threshold value. Descent of the aircraft may be terminated and cruising of the aircraft at a constant altitude may be initiated, when the differential pressure between the cabin pressure and the ambient pressure reaches the second calculated threshold value. During cruising of the aircraft at the constant altitude, the differential pressure between the cabin pressure and the ambient pressure may be kept constant such that the differential pressure between the cabin pressure and the ambient pressure during cruising of the aircraft at a constant altitude is kept constant at the second calculated threshold value.

When the aircraft cruises at a constant altitude, the supply of ambient air from the aircraft environment into the aircraft cabin and operation of the air outflow valve of the cabin pressurization system of the aircraft preferably are controlled such that the cabin pressure is higher than or equal to an ambient pressure prevailing in the aircraft environment at an altitude of 10,000 feet (3048 m). Maintaining the cabin pressure higher than or equal to the ambient pressure at the safe altitude of 10,000 feet (3048 m) ensures a high comfort level for the passengers and the crew members on board the aircraft. Simultaneously, the aircraft may cruise at a higher altitude, i.e., an altitude above 10,000 feet (3048 m) allowing a reduction of the fuel consumption of the aircraft and hence an increase of the range of the aircraft. Further, ambient air entering the aircraft cabin from the aircraft environment when the aircraft is cruising at an altitude above 10,000 feet (3048 m) is cooler than ambient air entering the aircraft cabin from the aircraft environment when the aircraft is cruising at a lower altitude allowing the temperature within the aircraft cabin to be maintained at a comfortable level even on hot days.

As already discussed above, the supply of ambient air from the aircraft environment into the aircraft cabin may be initiated automatically when, during descent of the aircraft, the differential pressure between the cabin pressure and the ambient pressure falls below the first calculated threshold value. Alternatively, the supply of ambient air from the aircraft environment into the aircraft cabin is initiated in dependence on a signal provided from a manually actuatable input device. The manually actuatable input device may be designed, for example, in the form of a push button provided in the cockpit of the aircraft. The push button may be actuated by the pilot of the aircraft when the pilot intends to allow initiation of the supply of ambient air from the aircraft environment into the aircraft cabin.

In the method for emergency ventilating and pressurizing an aircraft cabin, at least one of a number of passengers present within the aircraft cabin, an ambient temperature and a cabin temperature may be determined. The number of passengers present within the aircraft cabin may be stored in a suitable storage device or may be entered manually. The ambient temperature and the cabin temperature may be measured by suitable temperature sensors. A constant cruising altitude of the aircraft and the second calculated threshold value of the differential pressure between the cabin pressure and the ambient pressure, which is maintained while the aircraft is cruising at the constant cruising altitude, may be determined in dependence of at least one of the number of passengers present within the aircraft cabin, the ambient temperature and the cabin temperature. In particular, the constant cruising altitude of the aircraft and the second calculated threshold value of the differential pressure between the cabin pressure and the ambient pressure may be determined such that the comfort for the passengers and the crew members on board the aircraft is optimized. For example, the constant cruising altitude of the aircraft and the second calculated threshold value of the differential pressure between the cabin pressure and the ambient pressure may be determined so as to ensure that the cabin temperature does not exceed a predetermined comfort level while taking into account the number of passengers present within the aircraft and the ambient temperature.

Alternatively or additionally thereto, the method for emergency ventilating and pressurizing an aircraft cabin may involve determining an operational status of an aircraft air conditioning system. A leakage effective area may be calculated based on the cabin pressure, the ambient pressure and the operational status of the air conditioning system. A maximum constant cruising altitude of the aircraft then may be determined in dependence on the calculated leakage effective area and the second calculated threshold value of the differential pressure between the cabin pressure and the ambient pressure. In other words, the maximum pressurization capacity of the aircraft air conditioning system may be derived based on the operational status of the aircraft air conditioning system, and the maximum constant cruising altitude of the aircraft may then be determined based on the maximum pressurization capacity of the aircraft air conditioning system, while still ensuring that the differential pressure between the cabin pressure and the ambient pressure does not fall below the second calculated threshold value when the aircraft is cruising at the maximum constant cruising altitude. When the aircraft is cruising at the maximum constant cruising altitude, fuel consumption of the aircraft can be minimized and hence the range of the aircraft can be maximized, while still ensuring a certain comfort level for the passengers and the crew members on board the aircraft.

In the method for emergency ventilating and pressurizing an aircraft cabin, a position of the air outflow valve of the cabin pressurization system of the aircraft may be determined. Based on the position of the air outflow valve of the cabin pressurization system of the aircraft, it may be confirmed that the flow of ambient air from the aircraft environment into the aircraft cabin corresponds to at least the predetermined minimum value. In other words, the position of the air outflow valve of the cabin pressurization system of the aircraft may be used as an additional feedback parameter for obtaining a redundant confirmation that the flow of ambient air from the aircraft environment into the aircraft cabin corresponds to at least the predetermined minimum value. The position of the air outflow valve of the cabin pressurization system of the aircraft may be measured by means of a suitable sensor or may be calculated, for example based on a determination of a position of a motor driving a flap of the air outflow valve.

A system for emergency ventilating and pressurizing an aircraft cabin comprises a device for determining a cabin pressure prevailing within the aircraft cabin, a device for determining an ambient pressure prevailing in an aircraft environment, and a control unit. The control unit is adapted to initiate descent of the aircraft, when the cabin pressure falls below a predetermined threshold value and to initiate a supply of ambient air from the aircraft environment into the aircraft cabin, when, during descent of the aircraft, a differential pressure between the cabin pressure and the ambient pressure falls below a first calculated threshold value. Further, the electronic control unit is adapted to control the supply of ambient air from the aircraft environment into the aircraft cabin and operation of an air outflow valve of a cabin pressurization system of the aircraft such that a flow of ambient air from the aircraft environment into the aircraft cabin corresponds to at least a predetermined minimum value and the differential pressure between the cabin pressure and the ambient pressure does not fall below a second calculated threshold value.

The control unit may be adapted to control the supply of ambient air from the aircraft environment into the aircraft cabin and the operation of the air outflow valve of the cabin pressurization system of the aircraft such that a re-pressurization rate within the aircraft cabin is lower than an ambient pressure increase rate during descent of the aircraft.

The control unit may further be adapted to terminate descent of the aircraft and initiate cruising of the aircraft at a constant altitude when the differential pressure between the cabin pressure and the ambient pressure reaches a second calculated threshold value. In particular, the control unit may be adapted to control the supply of ambient air from the aircraft environment into the aircraft cabin and the operation of the aircraft outflow valve of the cabin pressurization system of the aircraft such that the cabin pressure is higher than or equal to an ambient pressure prevailing in the aircraft environment at an altitude of 10,000 feet (3048 m), when the aircraft cruises at a constant altitude.

Further, the control unit may be adapted to initiate the supply of ambient air from the aircraft environment into the aircraft cabin automatically or in dependence on a signal provided from a manually actuatable input device.

The system for emergency ventilating and pressurizing an aircraft cabin may further comprise at least one of a device for determining a number of passengers present within the aircraft cabin, a device for determining an ambient temperature, and a device for determining a cabin temperature. The control unit may be adapted to determine a constant cruising altitude of the aircraft and the second calculated threshold value of the differential pressure between the cabin pressure and the ambient pressure, which is maintained while the aircraft is cruising at the constant cruising altitude, in dependence on at least one of the number of passengers present within the aircraft cabin, the ambient temperature, and the cabin temperature.

The system for emergency ventilating and pressurizing an aircraft cabin may further comprise a device for determining an operational status of an aircraft air conditioning system. The control unit may be adapted to calculate a leakage effective area based on the cabin pressure, the ambient pressure, and the operational status of the aircraft air conditioning system, and to determine a maximum constant cruising altitude of the aircraft in dependence on the calculated leakage effective area and the second calculated threshold value of the differential pressure between the cabin pressure and the ambient pressure.

Finally, the system for emergency ventilating and pressurizing an aircraft cabin may comprise a device for determining a position of the air outflow valve of the cabin pressurization system of the aircraft. The control unit may be adapted to confirm that the flow of ambient air from the aircraft environment into the aircraft cabin corresponds to at least the predetermined minimum value based on the position of the air outflow valve of the cabin pressurization system of the aircraft.

BRIEF DESCRIPTION OF THE DRAWINGS

Preferred embodiments of the invention now are described in greater detail with reference to the appended schematic drawings, wherein.

DETAILED DESCRIPTION OF THE PREFERRED EMBODIMENTS

Figure 1:
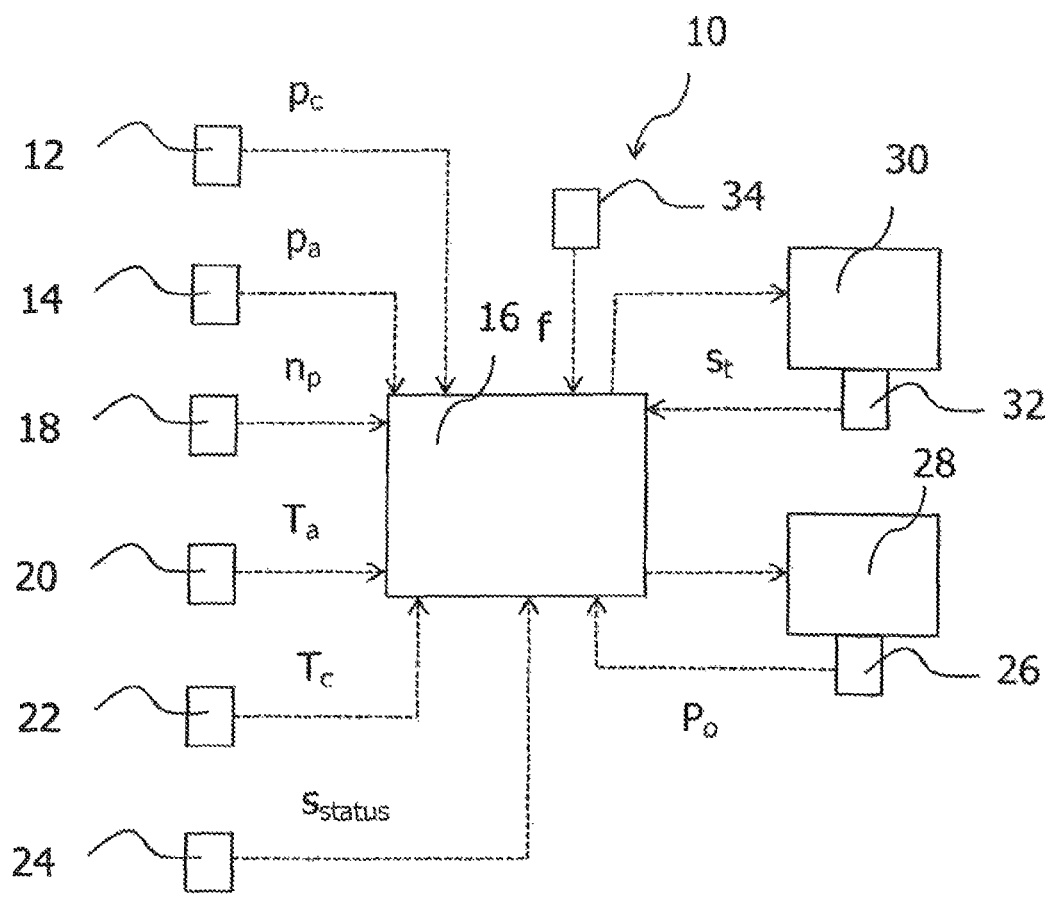
FIG. 1 shows a schematic diagram of a system for emergency ventilating and pressurizing an aircraft cabin.

A system 10 for emergency ventilating and pressurizing an aircraft cabin, which is shown in FIG. 1, comprises a device 12 for determining a cabin pressure pc prevailing within the aircraft cabin. The device 12 is designed in the form of a pressure sensor which is disposed within the aircraft cabin. The system 10 further comprises a device 14 for determining an ambient pressure pa prevailing in an aircraft environment. The device 14 is designed in the form of a pressure sensor disposed in an unpressurized region of the aircraft. The devices 12, 14 provide signals indicative of the cabin pressure pc and the ambient pressure pa, respectively, to an electronic control unit 16.

Further, the system 10 comprises a device 18 for determining a number of passengers np present within the aircraft cabin. The device 18 may be designed in the form of a suitable storage device wherein the number of passengers np present within the aircraft cabin is stored or may be designed in the form of an input device which allows a manual input of the number of passengers np present within the aircraft cabin. A device 20 of the system 10 serves for determining an ambient temperature Ta and is designed in the form of a temperature sensor. Further, a device 22 for determining a cabin temperature Tc is present, which is also designed in the form of a temperature sensor and which is disposed within the aircraft cabin. Moreover, the system 10 comprises a device 24 which serves to determine an operational status of an aircraft air conditioning system (not shown) and to transmit a signal status indicative of the operational status of the aircraft air conditioning system to the electronic control unit 16.

Moreover, a device 26 is present which allows determining a position Po, i.e., a degree of opening of an air outflow valve 28 of a cabin pressurization system of the aircraft. The device 26 may be designed in the form of a sensor or may be implemented in the form of software which is adapted to calculate the position of the air outflow valve 28. The devices 18, 20, 22, 24 and 26 provide signals to the electronic control unit 16 which are indicative of the number of passengers np present within the aircraft cabin, the ambient temperature Ta, the cabin temperature Tc, the operational status of the aircraft air conditioning system and the position of the air outflow valve 28 of the cabin pressurization system of the aircraft, respectively.

Based on the signals transmitted to the electronic control unit 16 from the devices 12, 14, 18, 20, 22, 24 and 26, the electronic control unit 16 provides control signals to an emergency ram air channel system 30, in particular to a motor driving an inlet flap of an emergency ram air channel. Upon controlling the operation of the emergency ram air channel system 30, i.e., the operation of the motor driving the inlet flap of the emergency ram air channel, the electronic control unit 16 also considers a signal st transmitted to the electronic control unit 16 from a manually actuatable input device 32. The manually actuatable input device 32 is designed in the form of a push button disposed in the cockpit of the aircraft. Further, based on the signals transmitted to the electronic control unit 16 from the devices 12, 14, 18, 20, 22, 24 and 26, the electronic control unit 16 provides control signals to the air outflow valve 28 of the cabin pressurization system, in particular to a motor driving a flap to the air outflow valve 28 so as to adjust a flow cross section of the air outflow valve 28. A flow f of ambient air from the aircraft environment into the aircraft cabin through the ram air channel is measured by means of a flow sensor 34 disposed in the emergency ram air channel.

Figure 2:
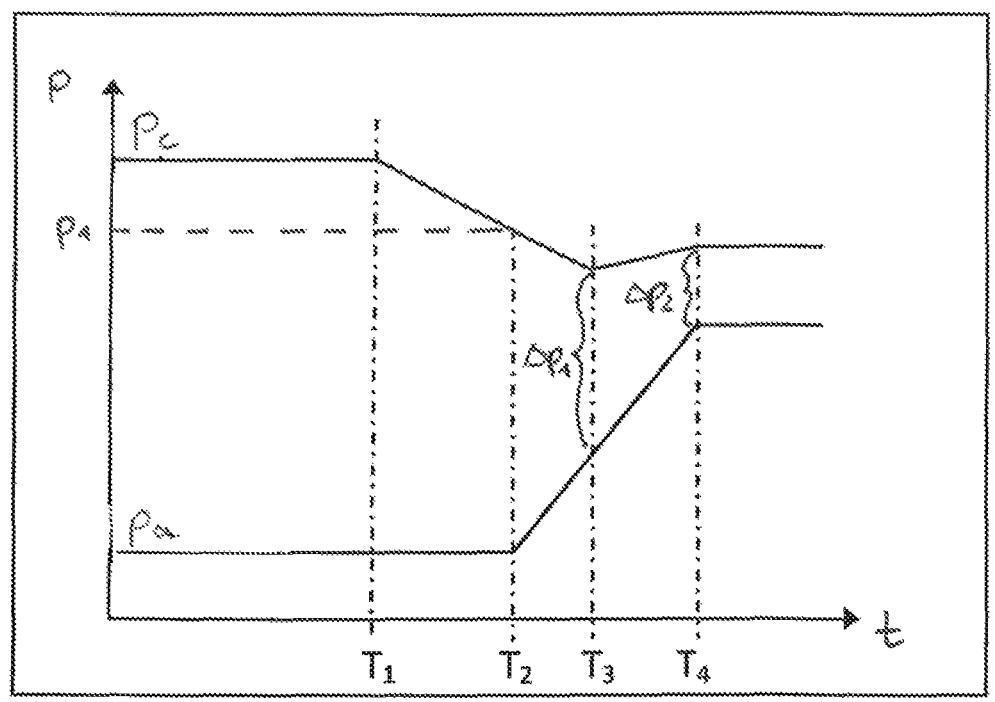
FIG. 2 shows a graphical representation of a time-dependent development of a cabin pressure and an ambient pressure during operation of the emergency ventilating and pressurizing system according to FIG. 1.

As becomes apparent from FIG. 2 depicting a time-dependent development of the cabin pressure pc and the ambient pressure pa, in the event of a depressurization of the aircraft cabin occurring at a point in time T1, for example due to failure of the aircraft air conditioning system and the presence of a leakage or a hole in an aircraft fuselage, the cabin pressure pc (upper curve in the diagram of FIG. 2) starts to decrease. When the cabin pressure pc at a point in time T2 reaches a predetermined threshold value p1, operation of the system 10 for emergency ventilating and pressurizing an aircraft cabin is started. Specifically, under the control of the control unit 16, descent of the aircraft is initiated. During descent of the aircraft, the ambient pressure pa (lower curve in the diagram of FIG. 2) increases, while the cabin pressure pc continues to decrease.

When, during descent of the aircraft, at a point in time T3, a differential pressure $\Delta p$ between the cabin pressure pc and the ambient pressure pa falls below a first calculated threshold value $\Delta p1$, or the signal st is transmitted to the electronic control unit 16 from the manually actuatable input device 32 indicating that the manually actuatable input device 32 has been actuated by the pilot of the aircraft, under the control of the electronic control unit 16, a supply of ambient air from the aircraft environment into the aircraft cabin is initiated. Specifically, the electronic control unit 16 provides control signals to the emergency ram air channel system 30, in particular the motor driving the inlet flap of the emergency ram air channel, resulting in ram air from the aircraft environment entering the ram air channel and further the aircraft cabin.

The supply of ambient air from the ram air channel to the aircraft cabin leads to a slight re-pressurization of the aircraft cabin. In order to stabilize and suitably control the re-pressurization of the aircraft cabin, a control of an operation of the air outflow valve 28 of the cabin pressurization system of the aircraft is involved in the control strategy executed by the electronic control unit 16. In particular, during further descent of the aircraft between the point in time T3 and a point in time T4, the electronic control unit 16 controls the operation of the air outflow valve 28 of the cabin pressurization system, in particular the operation of the motor driving the flap to the air outflow valve 28 so as to adjust the flow cross section of the air outflow valve 28. The supply of ambient air from the aircraft environment into the aircraft cabin and the operation of the air outflow valve 28, by the electronic control unit 16, are controlled such that the flow f of ambient air from the aircraft environment into the aircraft cabin corresponds to at least a predetermined minimum value fmin and the differential pressure Δp between the cabin pressure pc and the ambient pressure pa does not fall below a second calculated threshold value Δp2. The flow of ambient air from the aircraft environment into the aircraft cabin is continuously monitored by means of the flow sensor 34 or the flow is calculated.

During descent of the aircraft between the point in time T3 and the point in time T4, the electronic control unit 16 controls the supply of ambient air from the aircraft environment into the aircraft cabin via the emergency ram air channel and the operation of the air outflow valve 28 such that a re-pressurization rate within the aircraft cabin is lower than an ambient pressure increase rate. At the point in time T4, when the differential pressure Δp between the cabin pressure pc and the ambient pressure pa has reached the second calculated threshold value Δp2, descent of the aircraft is terminated and cruising of the aircraft at a constant altitude is initiated.

When the aircraft, after the point in time T4, cruises at a constant altitude, the supply of ambient air from the aircraft environment into the aircraft cabin and the operation of the air outflow valve 28, by the control unit 16, are controlled such that the cabin pressure pc is higher than or equal to an ambient pressure prevailing in the aircraft environment at an altitude of 10,000 feet (3048 m), while maintaining the differential pressure Δp between the cabin pressure pc and the ambient pressure pa constant at the second calculated threshold value Δp2. Hence, the aircraft may cruise at an altitude above 10,000 feet (3048 m) allowing a reduction of the fuel consumption of the aircraft and hence an increase of the range of the aircraft.

Figure 3:
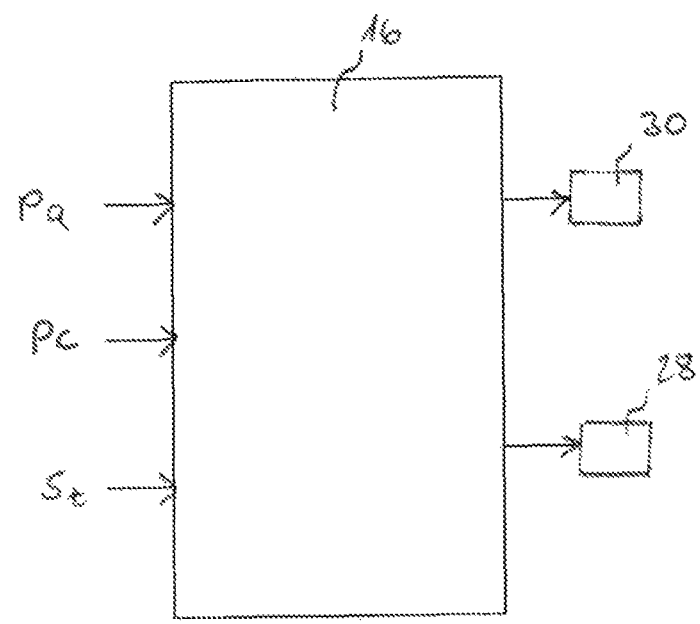
FIG. 3 shows a first embodiment of a method for emergency ventilating and pressurizing an aircraft cabin using the system according to FIG. 1.

As becomes apparent from FIG. 3, a method for emergency ventilating and pressurizing an aircraft cabin using the system 10 of FIG. 10 may simply involve the transmission of signals indicative of the ambient pressure pa and the cabin pressure pc as well as the signal st from the manually actuatable input device 32 to the electronic control unit 16. Based on the signals provided to the electronic control unit 16, the electronic control unit 16 may control the supply of ambient air from the aircraft environment into the aircraft cabin via the emergency ram air channel and the operation of the air outflow valve 28 as described above.

Figure 4:
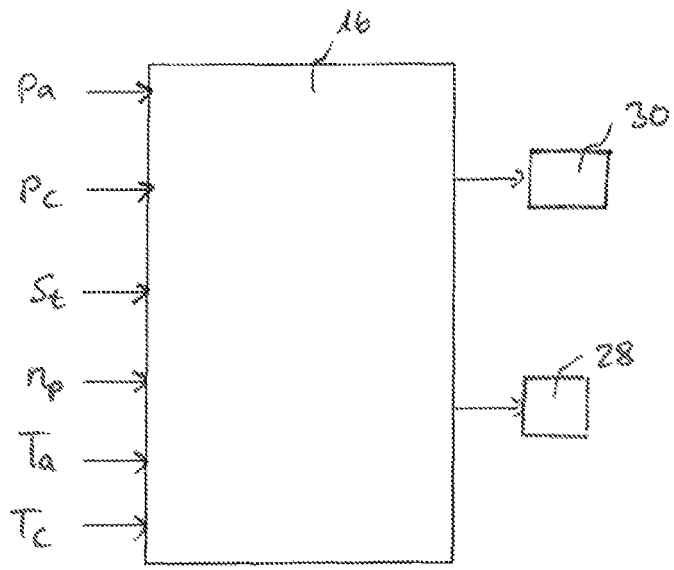
FIG. 4 shows a second embodiment of a method for emergency ventilating and pressurizing an aircraft cabin using the system according to FIG. 1.

As depicted in FIG. 4, it is, however, also conceivable for the electronic control unit 16, to consider, in addition to the ambient pressure pa, the cabin pressure pc and the signal st, also the number of passengers np present within the aircraft cabin, the ambient temperature Ta and the cabin temperature Tc may be determined. Specifically, the electronic control unit 16 may determine the constant cruising altitude of the aircraft after the point in time T4 and the second calculated threshold value Δp2 of the differential pressure between the cabin pressure and the ambient pressure, which is maintained while the aircraft is cruising at the constant cruising altitude, in dependence of the number of passengers np present within the aircraft cabin, the ambient temperature Ta and the cabin temperature Tc such that the comfort for the passengers and the crew members on board the aircraft is optimized.

Figure 5:
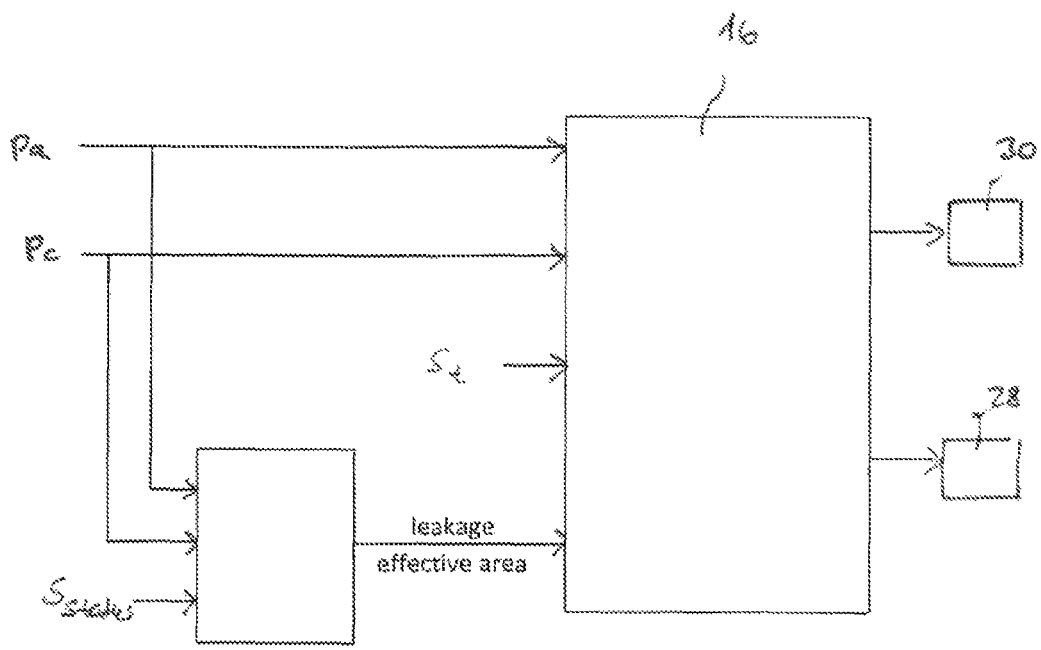
FIG. 5 shows a third embodiment of a method for emergency ventilating and pressurizing an aircraft cabin using the system according to FIG. 1.

As an alternative, the electronic control unit 16, in addition to the ambient pressure pa, the cabin pressure pc and the signal st might consider the signal status indicative of the operational status of the aircraft air conditioning system, i.e., the maximum pressurization capacity of the aircraft air conditioning system, see FIG. 5. The electronic control unit 16 may use the signal status indicative of the operational status of the aircraft air conditioning system, in addition to the signals indicative of the ambient pressure pa and the cabin pressure pc, for calculating a leakage effective area. A maximum constant cruising altitude of the aircraft then may be determined by the electronic control unit 16 in dependence on the calculated leakage effective area and the second calculated threshold value Δp2 of the differential pressure between the cabin pressure and the ambient pressure.

Figure 6:
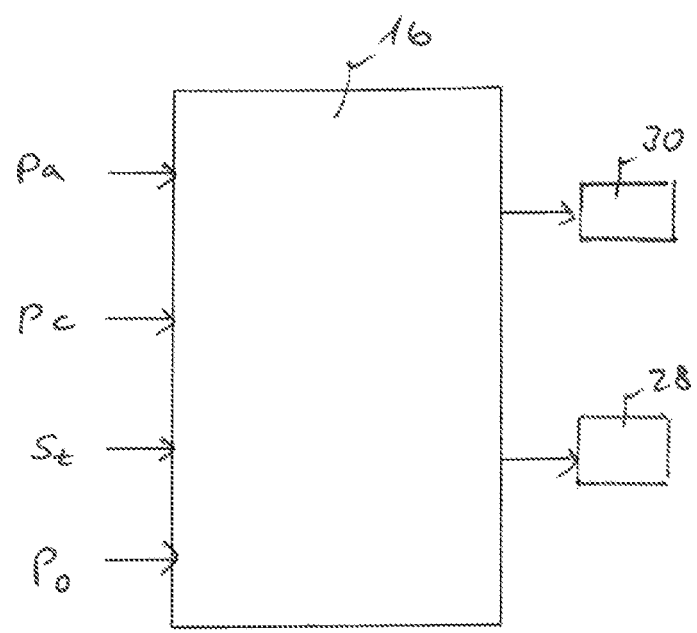
FIG. 6 shows a fourth embodiment of a method for emergency ventilating and pressurizing an aircraft cabin using the system according to FIG. 1.

Finally, as depicted in FIG. 6, the signal Po indicative of the position of the air outflow valve 28 of the cabin pressurization system of the aircraft may be used by the electronic control unit 16 upon controlling the supply of ambient air from the aircraft environment into the aircraft cabin and the operation of the air outflow valve 28. Specifically, the electronic control unit 16 may use the signal Po indicative of the position of the air outflow valve 28 as an additional feedback parameter for obtaining a redundant confirmation that the flow of ambient air from the aircraft environment into the aircraft cabin corresponds to at least the predetermined minimum value fmin.

Of course, the features of a method and a system for emergency ventilating and pressurizing an aircraft cabin, which are described above in connection with specific embodiments of the method and the system, may be combined as desired.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A method for emergency ventilating and pressurizing an aircraft cabin, comprising the steps:
   determining a cabin pressure prevailing within the aircraft cabin,
   determining an ambient pressure prevailing in an aircraft environment,
   initiating descent of the aircraft when the cabin pressure falls below a predetermined threshold value, initiating a supply of ambient air from the aircraft environment into the aircraft cabin, when, during descent of the aircraft, a differential pressure between the cabin pressure and the ambient pressure falls below a first calculated threshold value, and feedback controlling the supply of ambient air from the aircraft environment into the aircraft cabin based on a feedback signal indicative of a flow of ambient air from the aircraft environment into the aircraft cabin by adjusting a flow cross-section of an emergency ram inlet or of a valve allowing the supply of ambient air into the aircraft cabin and controlling an operation of an air outflow valve of a cabin pressurization system of the aircraft, such that a flow of ambient air from the aircraft environment into the aircraft cabin corresponds to at least a predetermined minimum value and the differential pressure between the cabin pressure and the ambient pressure does not fall below a second calculated threshold value.

2. The method of claim 1, wherein the supply of ambient air from the aircraft environment into the aircraft cabin and the operation of the air outflow valve of the cabin pressurization system of the aircraft are controlled such that a re-pressurization rate within the aircraft cabin is lower than an ambient pressure increase rate during descent of the aircraft.

3. The method of claim 1, further comprising the step:
terminating descent of the aircraft and initiating cruising of the aircraft at a constant altitude when the differential pressure between the cabin pressure and the ambient pressure reaches the second calculated threshold value.

4. The method of claim 1, further including a step of cruising the aircraft at a constant altitude, wherein, when the aircraft cruises at a constant altitude, the supply of ambient air from the aircraft environment into the aircraft cabin and operation of the air outflow valve of the cabin pressurization system of the aircraft are controlled such that the cabin pressure is higher than or equal to an ambient pressure prevailing in the aircraft environment at an altitude of 10,000 feet (3048 m).

5. The method of claim 1, wherein the supply of ambient air from the aircraft environment into the aircraft cabin is initiated in dependence on a signal provided from a manually actuatable input device.

6. The method of claim 1, further comprising at least one of the steps:
determining a number of passengers present within the aircraft cabin,
determining an ambient temperature, and
determining a cabin temperature,
wherein a constant cruising altitude of the aircraft and the second calculated threshold value of the differential pressure between the cabin pressure and the ambient pressure, which is maintained while the aircraft is cruising at the constant cruising altitude, are determined in dependence on at least one of the number of passenger preset within the aircraft cabin, the ambient temperature, and the cabin temperature.

7. The method of claim 1, further comprising the steps:
determining an operational status of an aircraft air conditioning system,
calculating a leakage effective area based on the cabin pressure, the ambient pressure and the operational status of the aircraft air conditioning system, and
determining a maximum constant cruising altitude of the aircraft in dependence on the calculated leakage effective area and the second calculated threshold value of the differential pressure between the cabin pressure and the ambient pressure.

8. The method of claim 1, further comprising the steps:
determining a position of the air outflow valve of the cabin pressurization system of the aircraft, and
confirming that the flow of ambient air from the aircraft environment into the aircraft cabin corresponds to at least the predetermined minimum value based on the position of the air outflow valve of the cabin pressurization system of the aircraft.

9. A system for emergency ventilating and pressurizing an aircraft cabin, comprising:
a device for determining a cabin pressure prevailing within the aircraft cabin,
a device for determining an ambient pressure prevailing in an aircraft environment, and
an electrical control device, the control device being adapted to:
initiate descent of the aircraft, when the cabin pressure falls below a predetermined threshold value,
initiate a supply of ambient air from the aircraft environment into the aircraft cabin, when, during descent of the aircraft, a differential pressure between the cabin pressure and the ambient pressure falls below a first calculated threshold value, and
feedback-control the supply of ambient air from the aircraft environment into the aircraft cabin based on a feedback signal indicative of a flow of ambient air from the aircraft environment into the aircraft cabin by adjusting a flow cross-section of an emergency ram inlet or of a valve allowing the supply of ambient air into the aircraft cabin and controlling an operation of an air outflow valve of a cabin pressurization system of the aircraft, such that a flow of ambient air from the aircraft environment into the aircraft cabin corresponds to at least a predetermined minimum value and the differential pressure between the cabin pressure and the ambient pressure does not fall below a second calculated threshold value.

10. The system of claim 9, wherein the control device is adapted to control the supply of ambient air from the aircraft environment into the aircraft cabin and the operation of the air outflow valve of the cabin pressurization system of the aircraft such that a re-pressurization rate within the aircraft cabin is lower than an ambient pressure increase rate during descent of the aircraft.

11. The system of claim 9, wherein the control device further is adapted to:
terminate descent of the aircraft and initiate cruising of the aircraft at a constant altitude when the differential pressure between the cabin pressure and the ambient pressure reaches the second calculated threshold value, wherein the control device in particular is adapted to control the supply of ambient air from the aircraft environment into the aircraft cabin and the operation of the air outflow valve of the cabin pressurization system of the aircraft such that the cabin pressure is higher than or equal to an ambient pressure prevailing in the aircraft environment at an altitude of 10,000 feet (3048 m), when the aircraft cruises at a constant altitude.

12. The system of claim 9, wherein the control device is adapted to initiate the supply of ambient air from the aircraft environment into the aircraft cabin automatically or in dependence on a signal provided from a manually actuatable input device.

13. A system for emergency ventilating and pressurizing an aircraft cabin, comprising:
- a device for determining a cabin pressure prevailing within the aircraft cabin,
- a device for determining an ambient pressure prevailing in an aircraft environment, and
- an electrical control device, the control device being adapted to:
  - initiate descent of the aircraft, when the cabin pressure falls below a predetermined threshold value,
  - initiate a supply of ambient air from the aircraft environment into the aircraft cabin, when, during descent of the aircraft, a differential pressure between the cabin pressure and the ambient pressure falls below a first calculated threshold value, and
  - control the supply of ambient air from the aircraft environment into the aircraft cabin and an operation of an air outflow valve of a cabin pressurization system of the aircraft such that a flow of ambient air from the aircraft environment into the aircraft cabin corresponds to at least a predetermined minimum value and the differential pressure between the cabin pressure and the ambient pressure does not fall below a second calculated threshold value, further comprising at least one of:
- a device for determining a number of passengers present within the aircraft cabin,
- a device for determining an ambient temperature, and
- a device for determining a cabin temperature,
- wherein the control device is adapted to determine a constant cruising altitude of the aircraft and the second calculated threshold value of the differential pressure between the cabin pressure and the ambient pressure, which is maintained while the aircraft is cruising at the constant cruising altitude, in dependence on at least one of the number of passengers present within the aircraft cabin, the ambient temperature, and the cabin temperature.

14. The system of claim 9, further comprising:
- a device for determining an operational status of an aircraft air conditioning system,
- wherein the control device is adapted to calculate a leakage effective area based on the cabin pressure, the ambient pressure and the operational status of the aircraft air conditioning system, and to determine a maximum constant cruising altitude of the aircraft in dependence on the calculated leakage effective area and the second calculated threshold value of the differential pressure between the cabin pressure and the ambient pressure.

15. The system of claim 9, further comprising:
- a device for determining a position of the air outflow valve of the cabin pressurization system of the aircraft,
- wherein the control device is adapted to confirm that the flow of ambient air from the aircraft environment into the aircraft cabin corresponds to at least the predetermined minimum value based on the position of the air outflow valve of the cabin pressurization system of the aircraft.

* * * * *